US012384989B2

(12) United States Patent
Garcia Marcos et al.

(10) Patent No.: US 12,384,989 B2
(45) Date of Patent: Aug. 12, 2025

(54) POLYMERIC ACTIVE INGREDIENTS WHICH IMPROVE DETERGENCY

(71) Applicant: BASF SE, Ludwigshafen am Rhein (DE)

(72) Inventors: Alejandra Garcia Marcos, Ludwigshafen (DE); Stephan Hueffer, Ludwigshafen (DE); Thomas Wesley Holcombe, Shanghai (CN); Roland Ettl, Ludwigshafen (DE); Alexander Panchenko, Ludwigshafen (DE); Susanne Carina Engert, Ludwigshafen (DE); Stefanie Juntermanns, Düsseldorf (DE); Frank Janssen, Cologne (DE); Michael Dreja, Cologne (DE); Nadine Bluhm, Düsseldorf (DE); Christa Junkes, Düsseldorf (DE)

(73) Assignee: BASF SE, Ludwigshafen am Rhein (DE)

( * ) Notice: Subject to any disclaimer, the term of this patent is extended or adjusted under 35 U.S.C. 154(b) by 1060 days.

(21) Appl. No.: 17/270,644

(22) PCT Filed: Aug. 8, 2019

(86) PCT No.: PCT/EP2019/071367
§ 371 (c)(1),
(2) Date: Feb. 23, 2021

(87) PCT Pub. No.: WO2020/043460
PCT Pub. Date: Mar. 5, 2020

(65) Prior Publication Data

US 2021/0207062 A1 Jul. 8, 2021

(30) Foreign Application Priority Data

Aug. 27, 2018 (EP) .................................... 18190901
Aug. 27, 2018 (EP) .................................... 18190906

(51) Int. Cl.

| | |
|---|---|
| ***C11D 3/26*** | (2006.01) |
| ***C11D 1/44*** | (2006.01) |
| ***C11D 1/83*** | (2006.01) |
| ***C11D 3/37*** | (2006.01) |
| ***C11D 11/00*** | (2006.01) |
| ***C11D 17/00*** | (2006.01) |
| *C11D 1/22* | (2006.01) |
| *C11D 1/72* | (2006.01) |

(52) U.S. Cl.
CPC .............. *C11D 3/3707* (2013.01); *C11D 1/83* (2013.01); *C11D 17/0008* (2013.01); *C11D 1/22* (2013.01); *C11D 1/72* (2013.01); *C11D 2111/12* (2024.01)

(58) Field of Classification Search
None
See application file for complete search history.

(56) References Cited

U.S. PATENT DOCUMENTS

| | | | | |
|---|---|---|---|---|
| 3,067,144 | A | 12/1962 | Michaels | |
| 3,213,028 | A | 10/1965 | Wood | |
| 3,868,336 | A | 2/1975 | Mazzola et al. | |
| 5,230,835 | A | 7/1993 | Deguchi et al. | |
| 6,146,427 | A | 11/2000 | Crutcher | |
| 6,387,872 | B1 * | 5/2002 | Bolzoni | C11D 1/44 510/421 |
| 8,093,202 | B2 | 1/2012 | Danziger et al. | |
| 9,528,076 | B2 | 12/2016 | Labeque | |
| 2005/0020466 | A1 * | 1/2005 | Man | C11D 3/046 510/392 |
| 2005/0032668 | A1 * | 2/2005 | Pedersen | A61P 31/00 510/499 |
| 2006/0293212 | A1 | 12/2006 | Griese et al. | |
| 2009/0124529 | A1 * | 5/2009 | Danziger | C08G 73/02 510/438 |
| 2012/0252064 | A1 * | 10/2012 | Valtakari | C11D 11/0017 435/197 |
| 2016/0340619 | A1 | 11/2016 | Scheibel et al. | |

FOREIGN PATENT DOCUMENTS

| | | | |
|---|---|---|---|
| DE | 3832589 | A1 | 3/1990 |
| DE | 102011089948 | A1 | 6/2013 |
| GB | 776661 | A | 6/1957 |
| RU | 2444564 | C2 | 3/2012 |
| RU | 2508395 | C2 | 2/2014 |
| WO | 1997032962 | A1 | 9/1997 |
| WO | 2008021971 | A1 | 2/2008 |
| WO | 2014154508 | A1 | 10/2014 |
| WO | 2016120141 | A1 | 8/2016 |
| WO | 2017005793 | A1 | 1/2017 |

OTHER PUBLICATIONS

International Search Report for corresponding PCT/EP2019/071367 mailed Nov. 15, 2019, 2 pages.
"Ethoxylation", Wikipedia, retrieved on Feb. 22, 2023, 7 pages. Available at <https://wiki5.ru/wiki/Ethoxylation>.
Belikov V.G, "Farmacevtitscheskaja chimija", Pharmaceutical chemistry, vol. 624, 2007, pp. 1-2, 23, 620.

(Continued)

*Primary Examiner* — Lorna M Douyon
(74) *Attorney, Agent, or Firm* — Armstrong Teasdale LLP

(57) ABSTRACT

Described herein are methods of using amino-based alkoxylates for improving the cleaning power of laundry detergent compositions.

18 Claims, No Drawings

(56) References Cited

OTHER PUBLICATIONS

Traven V.F, "Chapter 23-Amines .-M.: BINOM-Laboratory of Knowledge", Organic Chemistry, vol. 3, 4th Edition, 2015, pp. 1-2, 162-163.

European Search Report for EP Patent Application No. 18190901.1, Issued on Mar. 6, 2019, 3 pages.

European Search Report for EP Patent Application No. 18190906.0, Issued on Mar. 7, 2019, 3 pages.

Vaughn, et al., "Principles of performance testing of laundry detergents", Journal of the American Oil Chemists Society, vol. 27, Issue 7, pp. 249-257 (1950).

* cited by examiner

POLYMERIC ACTIVE INGREDIENTS WHICH IMPROVE DETERGENCY

CROSS-REFERENCE TO RELATED APPLICATIONS

This application is a U.S. National Phase Application of International Patent Application No. PCT/EP2019/071367, filed Aug. 8, 2019, which claims the benefit of priority to European Patent Application No. 18190901.1, filed Aug. 27, 2018, and which also claims the benefit of priority to European Patent Application No. 18190906.0, filed Aug. 27, 2018, the entire contents of which are hereby incorporated by reference herein.

FIELD OF INVENTION

The present invention relates to the use of specific polymers for enhancing the primary detergency of laundry detergent compositions when washing textiles with respect to in particular surfactant- or enzyme-sensitive soiling.

BACKGROUND

Laundry detergent compositions generally comprise, besides the ingredients which are indispensable for the washing process such as surfactants and builder materials, additional constituents which can be summarized under the term washing auxiliaries and encompass such different active agent groups as foam regulators, graying inhibitors, bleaches, bleach activators and color transfer inhibitors. Auxiliaries of this kind also include substances which when present enhance the detergency of surfactants without it generally being necessary for these substances to possess pronounced surfactant properties themselves. Such substances are often referred to as detergency enhancers.

The international patent application WO 2014/154508 A1 has disclosed that the application of block copolymers formed from polyether alcohol (meth)acrylic esters and amino alcohol (meth)acrylic esters or ammonium alcohol (meth)acrylic esters to textiles facilitates the detachment of soiling which subsequently becomes deposited on the textiles. The international patent application WO 2017/005793 A1 has disclosed that polyalkoxylated polyalkanolamines and polyalkoxylated polyalkyleneimines exhibit advantages in the reduction of fat residues. Surprisingly, it has now been found that certain less high molecular weight polymers also have particularly good primary detergency-enhancing properties.

DESCRIPTION

The polymers are (mono)amino-based alkoxylates, preferably propoxylates, having an average molecular weight $M_w$ of 600-10 000 g/mol, preferably 1300-6000 g/mol, particularly preferably 1400-4500 g/mol. The polymers according to the invention comprise only one amino group, that is to say only one nitrogen atom per molecule.

Especially suitable are alkoxylated amino alcohols having a molecular weight $M_w$ of more than 600 g/mol after the alkoxylation, with the amino nucleus having a molar mass of less than 200 g/mol and comprising only one amino group, and with the amino nucleus being alkoxylated with an alkylene oxide selected from the group consisting of ethylene oxide, propylene oxide, butylene oxide and mixtures thereof, preferably with a mixture comprising propylene oxide, particularly preferably with propylene oxide. The alkoxylated amino alcohols may involve block or random structures.

Particular preference is given, inter alia, to an alkoxylated amino alcohol obtainable starting from triethanolamine (TEA) by propoxylation, each of the three side arms preferably having a length of 15 propylene oxide (PO) units.

Preference is likewise also given to an alkoxylated amino alcohol, obtainable starting from triisopropanolamine (TIPA) by propoxylation, each of the three side arms preferably having a length of 15 propylene oxide (PO) units.

Also suitable are alkoxylated alkylmonoamines having a linear, branched or cyclic alkyl group, these being alkoxylated with an alkylene oxide selected from the group consisting of ethylene oxide, propylene oxide, butylene oxide and mixtures thereof, preferably with a mixture comprising propylene oxide, particularly preferably with propylene oxide.

The alkoxylated alkylmonoamines may involve block or random structures.

Preference is also given to an alkoxylated alkylmonoamine obtainable starting from tert-butylamine (tBA) by propoxylation, each of the two side arms preferably having a length of 12 propylene oxide (PO) units.

Suitable compounds are also defined by the generic structural formula below.

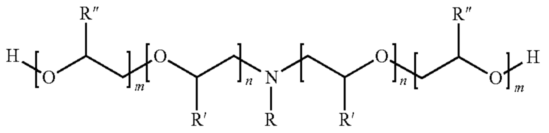

R=$C_1$-$C_{12}$ linear, cyclic or branched, $(CH_2—CHR'O)_n—(CH_2CHR''O)_m—H$

R'=H, $CH_3$, $CH_2CH_3$

R"=H, $CH_3$, $CH_2CH_3$ n=0-30, preferably: 0-10, most preferably: 0-5 m=0-30, preferably: 5-20, most preferably: 12-16

The invention thus provides for the use of polymers, consisting of (mono)amino-based alkoxylates, preferably propoxylates, having an average molecular weight $M_w$ of 600-10 000 g/mol, preferably 1300-6000 g/mol, particularly preferably 1400-4500 g/mol, for enhancing the primary detergency of laundry detergent compositions when washing textiles in in particular aqueous and surfactant-containing washing liquid with respect to in particular surfactant- or enzyme-sensitive soiling.

The invention further provides a method for removing in particular surfactant- or enzyme-sensitive soiling from textiles, in which a laundry detergent composition and a said polymeric active agent in an in particular aqueous and surfactant-containing washing liquor is brought into contact with soiled textiles. This method can be carried out manually or by machine, for example using a domestic washing machine. In this case it is possible to use the in particular liquid composition and the polymeric active agent at the same time or in succession. Simultaneous use can be carried out particularly advantageously through the use of a laundry detergent composition comprising the polymeric active agent. Surfactant- or enzyme-sensitive soiling is understood to mean soiling which is typically removable at least partly by surfactants or with the use of enzymes, such as for example soiling from oil, fat, make-up or grass, chocolate mousse or eggs. The polymers used according to the invention contribute to the removability of such soiling even in the absence of enzymes or in particular in the absence of bleaches.

The use according to the invention and the method according to the invention are preferably implemented by adding the polymer, consisting of (mono)amino-based alkoxylate, to a composition which is free of the corresponding polymer or to a washing liquor which comprises a composition which is free of the corresponding polymer, wherein the amount of polymer added, based on the total weight of the composition which is free of the corresponding polymer, is preferably in the range from 0.01% by weight to 20% by weight, in particular from 1% by weight to 15% by weight. Particularly preferably, the polymer which is essential to the invention is used together with in particular liquid laundry detergent compositions which, based on the total weight of the composition, have a surfactant concentration of at least 30% by weight, preferably in the range from 30% by weight to 65% by weight and in particular from 50% by weight to 58% by weight. The washing liquor is preferably produced by adding from 7 ml to 100 ml, in particular from 10 ml to 75 ml, preferably from 20 ml to 50 ml, of a liquid water-containing laundry detergent composition to 12 liters to 60 liters, in particular 15 liters to 20 liters, of water.

The polymers essential to the invention can be obtained by processes which are known in principle. This involves reacting the starter molecules, especially amino group-containing compounds, with alkylene oxides, such as ethylene oxide (EO), propylene oxide (PO) and/or butylene oxide (BO), preferably propylene oxide, preferably under alkaline catalysis.

The starter molecule is provided and dewatered. Then, under alkaline catalysis, for example using KOH, the epoxides are metered in in the desired sequence and amount.

Suitable procedures and reaction conditions for the alkoxylation are known in general to the person skilled in the art and are described, for example, in the standard work M. lonescu, “Chemistry and technology of polyols for polyurethanes”, Rapra Technology, Shrewsbury, UK, page 60 ff.

Preferred polymers used according to the invention, or their starting materials, are described in the paragraphs below.

Starters which may be used according to the invention for the polymers, consisting of certain described alkoxylates, include inter alia the following groups of compounds. (Mono)amino alcohols, for example, triethanolamine, alkyldiethanolamines, alkyldiisopropanolamines, trialkylamino alcohols such as triisopropanolamine, N,N-di(2-hydroxyethyl)cyclohexylamine, N,N-di(2-hydroxypropyl) cyclohexylamine, etc.

Preference is given in one embodiment to triethanolamine (TEA) as starter. In a further preferred embodiment, triisopropanolamine (TIPA) is used as starter.

Alkylmonoamines such as n-butylamine, n-hexylamine, n-octylamine, isopropylamine, sec-butylamine, tert-butylamine, cyclohexylamine, 2-ethylhexylamine, 2-phenylethylamine.

The starter in one embodiment is preferably tert-butylamine (tBA).

In a preferred embodiment, the polymer comprises more than 50 mol % propylene oxide units, based on the sum total of all alkylene oxide units. In a preferred embodiment, the polymer comprises more than 90 mol % propylene oxide units, based on the sum total of all alkylene oxide units. In a preferred embodiment, the polymer comprises exclusively propylene oxide units, based on the sum total of all alkylene oxide units.

Preferred polymers used according to the invention have a weight-average molecular weight of more than 600 g/mol, particularly preferably the weight-average molecular weight is in the range from 600-10 000 g/mol, in particular 1300-6000 g/mol, and very particularly preferably 1400-4500 g/mol.

In a preferred embodiment, the starter is reacted with an alkylene oxide consisting of propylene oxide or mixtures comprising propylene oxide. In particularly preferred embodiments, exclusively propylene oxide is used for the alkoxylation.

Preferably according to the invention, two chains of alkylene oxide units are added on for each nitrogen atom of the starter.

In another preferred embodiment, according to the invention three chains of alkylene oxide units are added on for each nitrogen atom of the starter.

In this case, in preferred embodiments of the invention, per alkylene oxide chain, 10 to 18 alkylene oxide units are added on, in particular 12 to 16 alkylene oxide units and particularly preferably 12 to 15 alkylene oxide units.

In the context of the use according to the invention and the method according to the invention, it is preferable for the concentration of above-defined polymer in the aqueous washing liquor, as is used for example in washing machines but also in hand washing, to be 0.001 g/I to 5 g/I, in particular 0.01 g/I to 2 g/l. The method according to the invention and the use according to the invention preferably involve operating at temperatures in the range from 10° C. to 95° C., in particular in the range from 20° C. to 40° C. The method according to the invention and the use according to the invention are preferably carried out at pH values in the range from pH 5 to pH 12, in particular from pH 7 to pH 11.

In connection with the use according to the invention or in the method according to the invention, laundry detergent compositions which can be used in addition to the polymer and which can be present as in particular pulverulent solids, in recompacted particle form, as solutions or suspensions, can comprise all ingredients known and customary in such compositions. The compositions can comprise in particular builder substances, surface-active surfactants, water-miscible organic solvents, enzymes, sequestering agents, electrolytes, pH regulators, polymers having special effects, such as soil release polymers, color transfer inhibitors, graying inhibitors, crease-reducing and form-retaining polymeric active agents, and further auxiliaries such as optical brighteners, foam regulators, dyes and fragrances. The compositions can comprise one or more surfactants, with in particular anionic surfactants, nonionic surfactants and mixtures thereof being usable, but cationic and/or amphoteric surfactants may also be present.

Nonionic surfactants used may be any nonionic surfactants known to the person skilled in the art. The nonionic surfactants used are preferably alkoxylated, advantageously ethoxylated, in particular primary alcohols having preferably 8 to 18 carbon atoms and, on average, 1 to 12 mol of ethylene oxide (EO) per mole of alcohol, in which the alcohol radical can be linear or preferably 2-methyl-branched or can comprise linear and methyl-branched radicals in a mixture, as customarily present in oxo alcohol radicals. In particular, however, preference is given to alcohol ethoxylates having linear radicals from alcohols of native origin having 12 to 18 carbons atoms, for example from coconut alcohol, palm oil alcohol, tallow fatty alcohol or oleyl alcohol, and on average 2 to 8 mol of EO per mole of alcohol. The preferred ethoxylated alcohols include, for example, $C_{12-14}$-alcohols with 3 EO or 4 EO, $C_{9-11}$-alcohol with 7 EO, $C_{13-15}$-alcohols with 3 EO, 5 EO, 7 EO or 8 EO, $C_{12-18}$-alcohols with 3 EO, 5 EO or 7 EO and mixtures of these, such as mixtures of $C_{12-14}$-alcohol with 3 EO and $C_{12-18}$-alcohol with 5 EO. The stated ethoxylation levels are statistical averages which may correspond to an integer or a fraction for a specific product. Preferred alcohol ethoxylates have a narrowed homolog distribution (narrow range ethoxylates, NREs).

Alternatively or in addition to these nonionic surfactants, it is also possible to use fatty alcohols with more than 12 EO. Examples of these are tallow fatty alcohol with 14 EO, 25 EO, 30 EO or 40 EO. Additionally, further nonionic surfactants that may be used are also alkyl glycosides of the general formula $R^5O(G)_x$, in which $R^5$ corresponds to a primary straight-chain or methyl-branched, especially 2-methyl-branched, aliphatic radical having 8 to 22, preferably 12 to 18, carbon atoms and G is the symbol for a glycose unit having 5 or 6 carbon atoms, preferably for glucose. The degree of oligomerization x, which indicates the distribution of monoglycosides and oligoglycosides, is any desired number between 1 and 10; preferably x is 1.2 to 1.4.

A further class of nonionic surfactants which are used with preference and are used either as the sole nonionic surfactant or in combination with other nonionic surfactants is that of alkoxylated, preferably ethoxylated or ethoxylated and propoxylated, fatty acid alkyl esters, preferably having 1 to 4 carbon atoms in the alkyl chain.

Nonionic surfactants of the amine oxide type, for example N-cocoalkyl-N,N-dimethylamine oxide and N-tallow-alkyl-N,N-dihydroxyethylamine oxide, and the fatty acid alkanolamides may also be used. The amount of these nonionic surfactants is preferably not more than that of the ethoxylated fatty alcohols, especially not more than half thereof.

Further suitable surfactants are polyhydroxy fatty acid amides of the formula

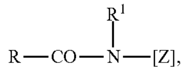

in which R is an aliphatic acyl radical having 6 to 22 carbon atoms, $R^1$ is hydrogen, an alkyl or hydroxyalkyl radical having 1 to 4 carbon atoms and [Z] is a linear or branched polyhydroxyalkyl radical having 3 to 10 carbon atoms and 3 to 10 hydroxyl groups. The polyhydroxy fatty acid amides are known substances which can typically be obtained by reductive amination of a reducing sugar with ammonia, an alkylamine or an alkanolamine and subsequent acylation with a fatty acid, a fatty acid alkyl ester or a fatty acid chloride. The group of the polyhydroxy fatty acid amides also includes compounds of the formula

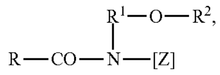

in which R is a linear or branched alkyl or alkenyl radical having 7 to 12 carbon atoms, $R^1$ is a linear, branched or cyclic alkyl radical or an aryl radical having 2 to 8 carbon atoms, and $R^2$ is a linear, branched or cyclic alkyl radical or an aryl radical or an oxyalkyl radical having 1 to 8 carbon atoms, with $C_{1-4}$-alkyl or phenyl radicals being preferred, and [Z] is a linear polyhydroxyalkyl radical the alkyl chain of which is substituted by at least two hydroxyl groups, or alkoxylated, preferably ethoxylated or propoxylated derivatives of this radical. [Z] is preferably obtained by reductive amination of a reduced sugar, for example glucose, fructose, maltose, lactose, galactose, mannose or xylose. The N-alkoxy- or N-aryloxy-substituted compounds can be converted to the desired polyhydroxy fatty acid amides by reaction with fatty acid methyl esters in the presence of an alkoxide as catalyst.

The anionic surfactants used are for example those of the sulfonate and sulfate type. Suitable surfactants of the sulfonate type here are preferably $C_{9-13}$-alkylbenzenesulfonates, olefinsulfonates, i.e. mixtures of alkene- and hydroxyalkanesulfonates, and also disulfonates, as obtained, for example, from $C_{12-18}$-monoolefins having a terminal or internal double bond by sulfonation with gaseous sulfur trioxide and subsequent alkaline or acidic hydrolysis of the sulfonation products. Also suitable are alkanesulfonates which are obtained from $C_{12-18}$-alkanes, for example, by sulfochlorination or sulfoxidation with subsequent hydrolysis and/or neutralization. Also likewise suitable are the esters of $\alpha$-sulfo fatty acids (ester sulfonates), for example the $\alpha$-sulfonated methyl esters of hydrogenated coconut, palm kernel or tallow fatty acids.

Further suitable anionic surfactants are sulfated fatty acid glycerol esters. Fatty acid glycerol esters are understood to mean the mono-, di- and triesters, and mixtures thereof, as obtained in the preparation by esterification of glycerol with 1 to 3 mol of fatty acid or in the transesterification of triglycerides with 0.3 to 2 mol of glycerol. Preferred sulfated fatty acid glycerol esters here are the sulfation products of saturated fatty acids having 6 to 22 carbon atoms, for example of caproic acid, caprylic acid, capric acid, myristic acid, lauric acid, palmitic acid, stearic acid or behenic acid.

Also suitable are alkyl sulfates of the general formula $$R—O—SO_3M,$$

in which R is a linear, branched-chain or cyclic saturated hydrocarbon radical having 12 to 18, in particular 12 to 14, carbon atoms, and M is a countercation which leads to charge neutralization of the sulfuric monoester, especially a sodium or potassium ion or an ammonium ion of the general formula $$R^1R^2R^3R^4N^+,$$

in which $R^1$, $R^2$, $R^3$ and $R^4$ independently of one another are hydrogen, an alkyl group having 1 to 4 carbon atoms or a hydroxyalkyl group having 2 to 3 carbon atoms. Preferred radicals R are derived from native $C_{12}$-$C_{18}$ fatty alcohols, such as from coconut fatty alcohol, tallow fatty alcohol, lauryl, myristyl, cetyl or stearyl alcohol, or from $C_{10}$-$C_{20}$-oxo alcohols or secondary alcohols of these chain lengths. Furthermore, preference is given to alkyl sulfates of the specified chain length which comprise a synthetic, straight-chain alkyl radical which has been prepared on a petrochemical basis, and which have analogous degradation behavior to the appropriate compounds based on oleochemical raw materials. Particular preference is given to $C_{12}$-$C_{16}$-alkyl sulfates and $C_{12}$-$C_{14}$-alkyl sulfates.

Also suitable are the sulfuric monoesters of the straight-chain or branched $C_{7-21}$-alcohols ethoxylated with 1 to 6 mol of ethylene oxide, such as 2-methyl-branched $C_{9-11}$-alcohols having on average 3.5 mol of ethylene oxide (EO) or $C_{12-18}$-fatty alcohols having 1 to 4 EO.

Further suitable anionic surfactants are also the salts of alkylsulfosuccinic acid, which are also referred to as sulfosuccinates or as sulfosuccinic acid esters and are the monoesters and/or diesters of sulfosuccinic acid with alcohols, preferably fatty alcohols and especially ethoxylated fatty alcohols. Preferred sulfosuccinates comprise $C_{8-18}$ fatty alcohol radicals or mixtures of these. Especially preferred sulfosuccinates comprise a fatty alcohol radical derived from ethoxylated fatty alcohols, which per se constitute nonionic surfactants. Particular preference is given here in turn to sulfosuccinates, the fatty alcohol radicals of which are derived from ethoxylated fatty alcohols having a narrowed homolog distribution. It is likewise also possible to use alk(en)ylsuccinic acid having preferably 8 to 18 carbon atoms in the alk(en)yl chain or salts thereof.

Suitable further anionic surfactants in particular include soaps. Saturated fatty acid soaps are suitable, such as the salts of lauric acid, myristic acid, palmitic acid, stearic acid, hydrogenated erucic acid and behenic acid, and especially soap mixtures derived from natural fatty acids, for example coconut fatty acids, palm kernel fatty acids or tallow fatty acids.

The anionic surfactants including the soaps may be present in the form of their sodium, potassium or ammonium salts, or as soluble salts of organic bases, such as mono-, di- or triethanolamine. The anionic surfactants are preferably in the form of their sodium or potassium salts, especially in the form of the sodium salts.

Cationic and/or amphoteric surfactants may also be used instead of the surfactants mentioned or in conjunction with them.

Examples of cationic active substances that can be used include cationic compounds of the following formulae:

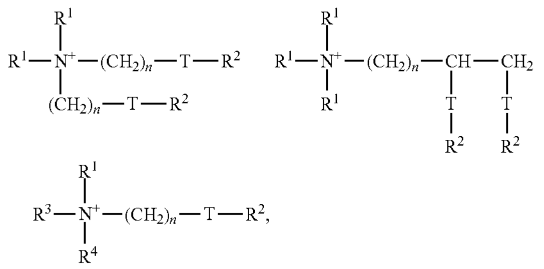

in which each group $R^1$ is independently selected from $C_{1-6}$-alkyl, -alkenyl, or -hydroxyalkyl groups; each group $R^2$ is independently selected from $C_{8-28}$-alkyl or -alkenyl groups; $R^3$=$R^1$ or $(CH_2)_n$-T-$R^2$; $R^4$=$R^1$ or $R^2$ or $(CH_2)_n$-T-$R^2$; T=—$CH_2$—, —O—CO— or —CO—O— and n is an integer from 0 to 5.

Surfactants of this kind are present in laundry detergent compositions in amounts of preferably 5% by weight to 65% by weight. As stated above, particularly preferred laundry detergent compositions are liquid and have surfactant contents of at least 30% by weight, preferably in the range from 30% by weight to 60% by weight and especially from 50% by weight to 58% by weight. Such concentrated liquid laundry detergent compositions are advantageous because they are associated with a lower use of resources, in particular brought about by a reduced transport weight and a reduced usage amount, meaning that compared to less-concentrated compositions for example a smaller bottle size and hence a reduced use of packaging material are needed to achieve the same performance. In addition, such highly-concentrated compositions are preferred by consumers, since they take up less storage space in households.

Textile-softening compounds may be used to care for textiles and to improve textile properties, such as a softer "handle" (finish) and reduced electrostatic charge (increased wear comfort). The active agents of these formulations are quaternary ammonium compounds having two hydrophobic residues, such as for example distearyldimethylammonium chloride, which, however, due to its inadequate biological degradability is increasingly being replaced by quaternary ammonium compounds which in their hydrophobic residues comprise ester groups as intended breakage points for biological degradation.

Such "esterquats" having improved biological degradability are obtainable for example by esterifying mixtures of methyldiethanolamine and/or triethanolamine with fatty acids and subsequently quaternizing the reaction products with alkylating agents in a known manner. A suitable finishing agent is dimethylolethyleneurea.

A laundry detergent composition preferably comprises at least one water-soluble and/or water-insoluble organic and/or inorganic builder. Water-soluble organic builder substances include polycarboxylic acids, especially citric acid and sugar acids, monomeric and polymeric aminopolycarboxylic acids, especially methylglycinediacetic acid, nitrilotriacetic acid and ethylenediaminetetraacetic acid, and also polyaspartic acid, polyphosphonic acids, especially aminotris(methylenephosphonic acid), ethylenediaminetetrakis (methylenephosphonic acid) and 1-hydroxyethane-1,1-diphosphonic acid, polymeric hydroxyl compounds such as dextrin and polymeric (poly)carboxylic acids, especially polycarboxylates obtainable by oxidation of polysaccharides/dextrins, and/or polymeric acrylic acids, methacrylic acids, maleic acids and copolymers of these, which may also comprise in copolymerized form small amounts of polymerizable substances without carboxylic acid functionality. The relative molecular mass of the homopolymers of unsaturated carboxylic acids is generally between 5000 g/mol and 200 000 g/mol, and that of the copolymers is between 2000 g/mol and 200 000 g/mol, preferably 50 000 g/mol to 120 000 g/mol, based in each case on the free acid. A particularly preferred acrylic acid-maleic acid copolymer has a relative molecular mass of 50 000 g/mol to 100 000 g/mol. Suitable, albeit less preferred, compounds of this class are copolymers of acrylic acid or methacrylic acid with vinyl ethers, such as vinyl methyl ethers, vinyl esters, ethylene, propylene and styrene, in which the proportion of the acid is at least 50% by weight. Water-soluble organic builder substances that can be used also include terpolymers which comprise, as monomers, two unsaturated acids and/or salts thereof and, as third monomer, vinyl alcohol and/or an esterified vinyl alcohol or a carbohydrate. The first acidic monomer or salt thereof is derived from a monoethylenically unsaturated $C_3$-$C_8$ carboxylic acid, and preferably from a $C_3$-$C_4$ monocarboxylic acid, in particular from (meth)acrylic acid. The second acidic monomer or salt thereof can be a derivative of a $C_4$-$C_8$ dicarboxylic acid, particular preference being given to maleic acid, and/or a derivative of an allylsulfonic acid which is substituted in the 2 position by an alkyl or aryl radical. Polymers of this kind generally have a relative molecular mass of between 1000 g/mol and 200 000 g/mol. Further preferred copolymers are those including, as monomers, acrolein and acrylic acid/acrylic acid salts or vinyl acetate. The organic builder substances can be used, in particular for the production of liquid compositions, in the form of aqueous solutions, preferably in the form of 30 to 50 percent by weight aqueous solutions. All acids mentioned are generally used in the form of their water-soluble salts, in particular their alkali metal salts.

Such organic builder substances can, if desired, be present in amounts of up to 40% by weight, in particular up to 25% by weight and preferably from 0.5% by weight to 8% by weight. Amounts in the upper half of the ranges mentioned are preferably used in paste-like or liquid, in particular water-containing, compositions.

Useful water-soluble inorganic builder materials include in particular polymeric alkali metal phosphates which may be present in the form of their alkaline, neutral or acidic sodium or potassium salts. Examples of these are tetrasodium diphosphate, disodium dihydrogen diphosphate, pentasodium triphosphate, what is known as sodium hexametaphosphate and the corresponding potassium salts and mixtures of sodium and potassium salts. Water-insoluble, water-dispersible inorganic builder materials used are in particular crystalline or amorphous alkali metal aluminosilicates, in amounts of up to 50% by weight, preferably of not more than 40% by weight, and in liquid compositions in particular from 1% by weight to 5% by weight. Among these, preference is given to crystalline sodium aluminosilicates in laundry detergent-quality, in particular zeolite A, P and optionally X. Amounts close to the upper limit mentioned are preferably used in solid, particulate compositions. Suitable aluminosilicates in particular have no particles with a particle size of greater than 30 μm and preferably consist to an extent of at least 80% by weight of particles with a size of below 10 μm. Their calcium binding capacity is generally in the range from 100 mg to 200 mg of CaO per gram.

Suitable substitutes or partial substitutes for the aluminosilicate mentioned are crystalline alkali metal silicates, which may be present alone or in a mixture with amorphous silicates. The alkali metal silicates usable as builders preferably have a molar ratio of alkali metal oxide to $SiO_2$ of less than 0.95, in particular of 1:1.1 to 1:12, and may be amorphous or crystalline. Preferred alkali metal silicates are the sodium silicates, in particular the amorphous sodium silicates, having an $Na_2O$:$SiO_2$ molar ratio of 1:2 to 1:2.8. Crystalline silicates used, which may be present alone or in a mixture with amorphous silicates, are preferably crystalline sheet silicates of the general formula $Na_2Si_xO_{2x+1}\cdot y\ H_2O$, in which x, the so-called modulus, is a number from 1.9 to 4 and y is a number from 0 to 20, and preferred values for x are 2, 3 or 4. Preferred crystalline sheet silicates are those in which x in the general formula mentioned takes the values 2 or 3. In particular, preference is given to both β- and δ-sodium disilicates ($Na_2Si_2O_5\cdot y\ H_2O$). It is also possible to use virtually anhydrous, crystalline alkali metal silicates of the abovementioned general formula, in which x is a number from 1.9 to 2.1, which are produced from amorphous alkali metal silicates. In a further preferred embodiment, a crystalline sodium sheet silicate having a modulus from 2 to 3 is used, as can be produced from sand and sodium carbonate. Crystalline sodium silicates having a modulus in the range from 1.9 to 3.5 are used in a further preferred embodiment. In a preferred configuration, a granular compound formed from alkali metal silicate and alkali metal carbonate is used, as is commercially available for example under the name Nabion® 15. If alkali metal aluminosilicate, in particular zeolite, is also present as an additional builder substance, the aluminosilicate-to-silicate weight ratio, based in each case on anhydrous active substances, is preferably 1:10 to 10:1. In compositions comprising both amorphous and crystalline alkali metal silicates, the weight ratio of amorphous alkali metal silicate to crystalline alkali metal silicate is preferably 1:2 to 2:1, and in particular 1:1 to 2:1.

Builder substances are present in laundry detergent compositions preferably in amounts of up to 60% by weight, in particular from 0.5% by weight to 40% by weight.

In a preferred configuration, the composition comprises a water-soluble builder block. The use of the term "builder block" is intended here to express the fact that the compositions do not comprise any further builder substances other than those which are water-soluble, that is to say that all builder substances present in the composition are encompassed in the "block" characterized as such, with the amounts of substances which may be present commercially in small amounts as impurities or stabilizing additives in the remaining ingredients of the compositions being excluded if necessary. The term "water-soluble" is intended to be understood to mean that the builder block dissolves without residue at the concentration which arises as a result of the use amount of the composition comprising it under the typical conditions. Preferably, at least 15% by weight and up to 55% by weight, in particular 25% by weight to 50% by weight, of water-soluble builder block is present in the compositions.

This is preferably composed of the components a) 5% by weight to 35% by weight of citric acid, alkali metal citrate and/or alkali metal carbonate, which may also be replaced at least partially by alkali metal hydrogencarbonate,
b) up to 10% by weight of alkali metal silicate having a modulus in the range from 1.8 to 2.5,
c) up to 2% by weight of phosphonic acid and/or alkali metal phosphonate,
d) up to 50% by weight of alkali metal phosphate, and
e) up to 10% by weight of polymeric polycarboxylate, the amounts given being based on the total laundry detergent composition. This also applies for all amounts indicated hereinafter, unless expressly stated otherwise.

In a preferred embodiment, the water-soluble builder block comprises at least 2 of the components b), c), d) and e) in amounts of greater than 0% by weight.

With regard to component a), in a preferred embodiment 15% by weight to 25% by weight of alkali metal carbonate, which may be replaced at least partially by alkali metal hydrogencarbonate, and up to 5% by weight, especially 0.5% by weight to 2.5% by weight, of citric acid and/or alkali metal citrate are present. In an alternative embodiment, as component a), 5% by weight to 25% by weight, especially 5% by weight to 15% by weight, of citric acid and/or alkali metal citrate, and up to 5% by weight, especially 1% by weight to 5% by weight, of alkali metal carbonate, which may be replaced at least partially by alkali metal hydrogencarbonate, are present. If both alkali metal carbonate and alkali metal hydrogencarbonate are present, component a) comprises alkali metal carbonate and alkali metal hydrogencarbonate preferably in a weight ratio of 10:1 to 1:1.

With regard to component b), in a preferred embodiment 1% by weight to 5% by weight of alkali metal silicate having a modulus in the range from 1.8 to 2.5 is present.

With regard to component c), in a preferred embodiment 0.05% by weight to 1% by weight of phosphonic acid and/or alkali metal phosphonate is present. Phosphonic acids are understood here also to be optionally substituted alkylphosphonic acids which may also comprise two or more phosphonic acid moieties (so-called polyphosphonic acids). They are preferably selected from hydroxy- and/or aminoalkylphosphonic acids and/or their alkali metal salts, such as for example dimethylaminomethanediphosphonic acid, 3-aminopropane-1-hydroxy-1,1-diphosphonic acid, 1-amino-1-phenylmethanediphosphonic acid, 1-hydroxyethane-1,1-diphosphonic acid, aminotris(methylenephosphonic acid), N,N,N',N'-ethylenediaminetetrakis(methylenephosphonic acid) and acylated derivatives of phosphorous acid, which may also be used in any desired mixtures.

With regard to component d), in a preferred embodiment 15% by weight to 35% by weight of alkali metal phosphate, especially trisodium polyphosphate, is present. In this case, “alkali metal phosphate” is the collective term for the alkali metal (especially sodium and potassium) salts of the various phosphoric acids, among which it is possible to distinguish between metaphosphoric acids $(HPO_3)_n$ and orthophosphoric acid $H_3PO_4$, in addition to higher molecular weight representatives. Phosphates combine a number of advantages: They act as alkali carriers, prevent limescale deposits on machine components or limescale encrustations in fabrics and moreover contribute to cleaning performance. Sodium dihydrogen phosphate, $NaH_2PO_4$, exists as a dihydrate (density 1.91 g $cm^{-3}$, melting point 60°) and as a monohydrate (density 2.04 g $cm^{-3}$). Both salts are white powders which are very readily soluble in water and on heating lose water of crystallization and at 200° C. are converted to the weakly acidic diphosphate (disodium hydrogen diphosphate, $Na_2H_2P_2O_7$), and at higher temperature to sodium trimetaphosphate ($Na_3P_3O_9$) and Maddrell's salt. $NaH_2PO_4$ is acidic, it is formed when phosphoric acid is adjusted to a pH of 4.5 with sodium hydroxide solution and the slurry is sprayed. Potassium dihydrogen phosphate (primary or monobasic potassium phosphate, potassium biphosphate, KDP), $KH_2PO_4$, is a white salt with a density of 2.33 g $cm^{-3}$, has a melting point of 253° (decomposition to form $(KPO_3)_x$, potassium polyphosphate) and is readily soluble in water. Disodium hydrogen phosphate (secondary sodium phosphate), $Na_2HPO_4$, is a colorless, very readily water-soluble, crystalline salt. It exists in anhydrous form and with 2 mol (density 2.066 g $cm^{-3}$, loss of water at 950), 7 mol (density 1.68 g $cm^{-3}$, melting point 480 with loss of $5H_2O$) and 12 mol of water (density 1.52 g $cm^{-3}$, melting point 350 with loss of $5H_2O$), becomes anhydrous at 1000 and on more intense heating is converted to the diphosphate $Na_4P_2O_7$. Disodium hydrogen phosphate is prepared by neutralization of phosphoric acid with sodium carbonate solution using phenolphthalein as an indicator. Dipotassium hydrogen phosphate (secondary or dibasic potassium phosphate), $K_2HPO_4$, is an amorphous, white salt which is readily soluble in water. Trisodium phosphate, tertiary sodium phosphate, $Na_3PO_4$, are colorless crystals which as the dodecahydrate have a density of 1.62 g $cm^{-3}$ and a melting point of 73-76° C. (decomposition), as the decahydrate (corresponding to 19-20% $P_2O_5$) have a melting point of 100° C. and in anhydrous form (corresponding to 39-40% $P_2O_5$) have a density of 2.536 g $cm^{-3}$. Trisodium phosphate is readily soluble in water with an alkaline reaction and is prepared by evaporative concentration of a solution of exactly 1 mol of disodium phosphate and 1 mol of NaOH. Tripotassium phosphate (tertiary or tribasic potassium phosphate), $K_3PO_4$, is a white, deliquescent, granular powder with a density of 2.56 g $cm^{-3}$, has a melting point of 1340° and is readily soluble in water with an alkaline reaction. It is formed for example when heating Thomas slag with charcoal and potassium sulfate. Despite the relatively high cost, the more readily soluble, and hence highly effective, potassium phosphates are often preferred over corresponding sodium compounds. Tetrasodium diphosphate (sodium pyrophosphate), $Na_4P_2O_7$, exists in anhydrous form (density 2.534 g $cm^{-3}$, melting point 988°, also stated as 880°) and as a decahydrate (density 1.815-1.836 g $cm^{-3}$, melting point 94° with loss of water). Both substances are colorless crystals which are soluble in water with an alkaline reaction. $Na_4P_2O_7$ is formed when heating disodium phosphate to >200° or by reacting phosphoric acid with sodium carbonate in stoichiometric ratio and dewatering the solution by spraying. The decahydrate complexes heavy metal salts and hardness formers and hence reduces the hardness of the water. Potassium diphosphate (potassium pyrophosphate), $K_4P_2O_7$, exists in the form of the trihydrate and is a colorless, hygroscopic powder having a density of 2.33 g $cm^{-3}$ which is soluble in water, the pH of the 1% solution being 10.4 at 25°. Condensation of $NaH_2PO_4$ or $KH_2PO_4$ forms higher molecular weight sodium and potassium phosphates, among which it is possible to distinguish between cyclic representatives, the sodium and potassium metaphosphates, and chain-like types, the sodium and potassium polyphosphates. Especially for the latter, a multiplicity of designations are in use: fused or calcined phosphates, Graham's salt, Kurrol's salt and Maddrell's salt. All higher sodium and potassium phosphates are collectively referred to as condensed phosphates. The industrially important pentasodium triphosphate, $Na_5P_3O_1$, (sodium tripolyphosphate), is a non-hygroscopic, white, water-soluble salt of the general formula NaO—[P(O)(ONa)—O]$_n$—Na, where n=3, which is anhydrous or crystallizes with $6H_2O$. In 100 g of water, about 17 g of the salt free of water of crystallization dissolves at room temperature, approximately 20 g dissolves at 60°, and about 32 g dissolves at 100°; after two hours of heating the solution to 100° hydrolysis leads to about 8% orthophosphate and 15% diphosphate. In the preparation of pentasodium triphosphate, phosphoric acid is reacted with sodium carbonate solution or sodium hydroxide solution in stoichiometric ratio and the solution is dewatered by spraying. Similarly to Graham's salt and sodium diphosphate, pentasodium triphosphate dissolves many insoluble metal compounds (including lime soaps, etc.). Pentapotassium triphosphate, $K_5P_3O_{10}$, (potassium tripolyphosphate), is commercially available for example in the form of a 50% by weight solution (>23% $P_2O_5$, 25% $K_2O$). There are also sodium potassium tripolyphosphates, which are also usable within the context of the present invention. These are formed for example when sodium trimetaphosphate is hydrolyzed with KOH:

$$(NaPO_3)_3\text{+2 KOH } Na_3K_2P_3O_{10}\text{+}H_2O$$

These are usable just like sodium tripolyphosphate, potassium tripolyphosphate or mixtures of these two; mixtures of sodium tripolyphosphate and sodium potassium tripolyphosphate or mixtures of potassium tripolyphosphate and sodium potassium tripolyphosphate or mixtures of sodium tripolyphosphate and potassium tripolyphosphate and sodium potassium tripolyphosphate are also usable.

With regard to component e), in a preferred embodiment of the compositions 1.5% by weight to 5% by weight of polymeric polycarboxylate, especially selected from the polymerization or copolymerization products of acrylic acid, methacrylic acid and/or maleic acid is present. Among these, particular preference is given to the homopolymers of acrylic acid and among these in turn those having an average molar mass in the range from 5000 D to 15 000 D (PA standard).

Enzymes usable in the compositions include those from the class of the lipases, cutinases, amylases, pullulanases, mannanases, cellulases, hemicellulases, xylanases and peroxidases and also mixtures thereof, for example amylases such as Termamyl®, Amylase-LT®, Maxamyl®, Duramyl® and/or Purafect® OxAm, lipases such as Lipolase®, Lipomax®, Lumafast®, Lipozym® and/or Lipex®, cellulases such as Celluzyme® and/or Carezyme®. Enzymatic active agents obtained from fungi or bacteria such as *Bacillus subtilis, Bacillus licheniformis, Streptomyces griseus, Humicola lanuginosa, Humicola insolens, Pseudomonas pseudoalcaligenes* or *Pseudomonas cepacia* are particularly suitable. The optionally used enzymes can be adsorbed onto carrier substances and/or embedded in coating substances in order to protect them from premature inactivation. They are preferably present in laundry detergent compositions in amounts of up to 10% by weight, especially of 0.2% by weight to 2% by weight.

In a preferred embodiment, the composition comprises 5% by weight to 65% by weight, in particular 8% to 55% by weight, of anionic and/or nonionic surfactant, up to 60% by weight, in particular 0.5% to 40% by weight, of builder substance, and 0.2% by weight to 5% by weight of enzyme selected from lipases, cutinases, amylases, pullulanases, mannanases, cellulases, oxidases and peroxidases and mixtures thereof.

The organic solvents which can be used in the laundry detergent compositions, in particular when they are in liquid or paste form, include alcohols having 1 to 4 carbon atoms, in particular methanol, ethanol, isopropanol and tert-butanol, diols having 2 to 4 carbon atoms, in particular ethylene glycol and propylene glycol, and mixtures thereof and the ethers derivable from the compound classes mentioned. Water-miscible solvents of this kind are present in the compositions preferably in amounts not exceeding 30% by weight, in particular of from 6% by weight to 20% by weight.

Examples of polymers of natural origin which can be used as thickeners in aqueous liquid compositions include agar-agar, carrageenan, tragacanth, gum arabic, alginates, pectins, polyoses, guar flour, carob seed flour, starch, dextrins, gelatin and casein, cellulose derivatives such as carboxymethyl cellulose, hydroxyethyl and -propyl cellulose, and polymeric polysaccharide thickeners such as xanthan; in addition to these, fully synthetic polymers such as polyacrylic and polymethacrylic compounds, vinyl polymers, polycarboxylic acids, polyethers, polyimines, polyamides and polyurethanes are also usable as thickeners.

In order to set a desired pH not arising intrinsically from the mixture of the remaining components, the compositions can comprise system-compatible and environmentally compatible acids, especially citric acid, acetic acid, tartaric acid, malic acid, lactic acid, glycolic acid, succinic acid, glutaric acid and/or adipic acid, but also mineral acids, especially sulfuric acid, or bases, especially ammonium or alkali metal hydroxides. pH regulators of this kind are present in the compositions preferably not exceeding 20% by weight, in particular from 1.2% by weight to 17% by weight.

Polymers able to detach soil, often referred to as "soil release" active agents or, due to their ability to render the treated surface, for example of the fibers, dirt-repellent, as "soil repellents", are for example nonionic or cationic cellulose derivatives. The in particular polyester-active soil release polymers include copolyesters of dicarboxylic acids, for example adipic acid, phthalic acid or terephthalic acid, diols, for example ethylene glycol or propylene glycol, and polydiols, for example polyethylene glycol or polypropylene glycol. The soil release polyesters preferably used include those compounds which are formally obtainable by esterification of two monomer parts, the first monomer being a dicarboxylic acid HOOC-Ph-COOH and the second monomer being a diol $H(O—(CHR^{11}—)_aOH$, which may also be in the form of a polymeric diol $H—(O—(CHR^{11}—)_a)_bOH$. Here, Ph means an o-, m- or p-phenylene radical which may bear 1 to 4 substituents selected from alkyl radicals having 1 to 22 carbon atoms, sulfonic acid groups, carboxyl groups and mixtures thereof, $R^{11}$ is hydrogen, an alkyl radical having 1 to 22 carbon atoms and mixtures thereof, a is a number from 2 to 6 and b is a number from 1 to 300. The polyesters obtainable from these preferably comprise both monomer diol units $—O—(CHR^{11}—)_aO—$ and polymer diol units$—(O—(CHR^{11}—)_a)_bO—$. The molar ratio of monomer diol units to polymer diol units is preferably 100:1 to 1:100, especially 10:1 to 1:10. The degree of polymerization b in the polymer diol units is preferably in the range from 4 to 200, especially from 12 to 140. The molecular weight or the average molecular weight or the maximum of the molecular weight distribution of preferred soil release polyesters is in the range from 250 to 100 000, in particular from 500 to 50 000. The acid forming the basis of the radical Ph is preferably selected from terephthalic acid, isophthalic acid, phthalic acid, trimellitic acid, mellitic acid, isomers of sulfophthalic acid, sulfoisophthalic acid and sulfoterephthalic acid, and mixtures thereof. If the acid groups of these are not part of the ester bonds in the polymer, they are preferably present in salt form, especially as alkali metal or ammonium salt. Among these, particular preference is given to the sodium and potassium salts. If desired, instead of the monomer HOOC-Ph-COOH, low proportions, in particular not more than 10 mol % based on the content of Ph with the definition given above, of other acids having at least two carboxyl groups may be present in the soil release polyester. These include, for example, alkylene- and alkenylenedicarboxylic acids such as malonic acid, succinic acid, fumaric acid, maleic acid, glutaric acid, adipic acid, pimelic acid, suberic acid, azelaic acid and sebacic acid. Preferred diols $HO—(CHR^{11}—)_aOH$ include those in which $R^{11}$ is hydrogen and a is a number from 2 to 6 and those in which a has the value 2 and $R^{11}$ is selected from hydrogen and alkyl radicals having 1 to 10, especially 1 to 3, carbon atoms. Particular preference among the last-mentioned diols is given to those of the formula $HO—CH_2—CHR^{11}—OH$ in which $R^{11}$ has the abovementioned meaning. Examples of diol components are ethylene glycol, 1,2-propylene glycol, 1,3-propylene glycol, butane-1,4-diol, pentane-1,5-diol, hexane-1,6-diol, octane-1,8-diol, decane-1,2-diol, dodecane-1,2-diol and neopentyl glycol. Among the polymeric diols, polyethylene glycol having a mean molar mass in the range from 1000 to 6000 is particularly preferred. If desired, these polyesters can also be end-capped, with usable end groups being alkyl groups having 1 to 22 carbon atoms and esters of monocarboxylic acids. The end groups bonded via ester bonds can be based on alkyl-, alkenyl- and arylmonocarboxylic acids having 5 to 32 carbon atoms, especially 5 to 18 carbon atoms. These include valeric acid, caproic acid, enanthic acid, caprylic acid, pelargonic acid, capric acid, undecanoic acid, undecenoic acid, lauric acid, lauroleic acid, tridecanoic acid, myristic acid, myristoleic acid, pentadecanoic acid, palmitic acid, stearic acid, petroselinic acid, petroselaidic acid, oleic acid, linoleic acid, linolelaidic acid, linolenic acid, eleostearic acid, arachic acid, gadoleic acid, arachidonic acid, behenic acid, erucic acid, brassidic acid, clupanodonic acid, lignoceric acid, cerotic acid, melissic acid, benzoic acid which can bear 1 to 5 substituents with a total of no more than 25 carbon atoms, in particular 1 to 12 carbon atoms, for example tert-butylbenzoic acid. The end groups can also be based on hydroxymonocarboxylic acids having 5 to 22 carbon atoms, which for example include hydroxyvaleric acid, hydroxycaproic acid, ricinoleic acid, its hydrogenation product hydroxystearic acid and o-, m- and p-hydroxybenzoic acid. The hydroxymonocarboxylic acids for their part may be joined to one another via their hydroxyl group and their carboxyl group, and can hence be present multiple times in an end group. The number of hydroxymonocarboxylic acid units per end group, i.e. the oligomerization degree thereof, is preferably in the range from 1 to 50, especially from 1 to 10. In a preferred configuration of the invention, polymers formed from ethylene terephthalate and polyethylene oxide terephthalate, in which the polyethylene glycol units have molar masses of 750 to 5000 and the molar ratio of ethylene terephthalate to polyethylene oxide terephthalate is 50:50 to 90:10, are used alone or in combination with cellulose derivatives.

Color transfer inhibitors useful for use in compositions for washing textiles include in particular polyvinylpyrrolidones, polyvinylimidazoles, polymeric N-oxides such as poly(vinylpyridine N-oxide) and copolymers of vinylpyrrolidone with vinylimidazole and optionally further monomers.

The compositions can comprise anti-crease agents, since textile fabrics, in particular made from rayon, wool, cotton and mixtures thereof, can have a tendency to creasing since the individual fibers are sensitive to bending, folding, pressing and squeezing transverse to the fiber direction. These include, for example, synthetic products based on fatty acids, fatty acid esters, fatty acid amides, fatty acid alkylol esters, fatty acid alkylol amides or fatty alcohols, which have usually been reacted with ethylene oxide, or products based on lecithin or modified phosphoric esters.

Graying inhibitors have the task of keeping the soil detached from the hard surface and especially from the textile fiber in suspension in the liquor. Water-soluble colloids of usually organic nature are suitable for this purpose, for example starch, glue, gelatin, salts of ether carboxylic acids or ether sulfonic acids of starch or of cellulose or salts of acidic sulfuric esters of cellulose or of starch. Water-soluble, acidic group-comprising polyamides are also suitable for this purpose. It is also possible to use starch derivatives other than those mentioned above, for example aldehyde starches. Preference is given to using cellulose ethers, such as carboxymethyl cellulose (Na salt), methyl cellulose, hydroxyalkyl cellulose and mixed ethers, such as methyl hydroxyethyl cellulose, methyl hydroxypropyl cellulose, methyl carboxymethyl cellulose and mixtures thereof, for example in amounts of 0.1% to 5% by weight, based on the compositions.

The compositions can comprise optical brighteners, among these in particular derivatives of diaminostilbenedisulfonic acid or the alkali metal salts thereof. For example, salts of 4,4'-bis(2-anilino-4-morpholino-1,3,5-triazinyl-6-amino)stilbene-2,2'-disulfonic acid or similarly structured compounds which instead of the morpholino group bear a diethanolamino group, a methylamino group, an anilino group or a 2-methoxyethylamino group, are suitable. Brighteners of the substituted diphenylstyryl type may also be present, for example alkali metal salts of 4,4'-bis(2-sulfostyryl)diphenyl, 4,4'-bis(4-chloro-3-sulfostyryl)diphenyl, or 4-(4-chlorostyryl)-4'-(2-sulfostyryl)diphenyl. Mixtures of the aforementioned optical brighteners may also be used.

In particular when used in machine washing processes, it can be advantageous to add customary foam inhibitors to the compositions. Examples of suitable foam inhibitors include soaps of natural or synthetic origin having a high proportion of $C_{18}$-$C_{24}$ fatty acids. Suitable non-surfactant-type foam inhibitors are for example organopolysiloxanes and mixtures thereof with microfine, optionally silanized silica and paraffins, waxes, microcrystalline waxes and mixtures thereof with silanized silica or bis fatty acid alkylenediamides. It is also advantageous to use mixtures of various foam inhibitors, for example those formed from silicones, paraffins or waxes. The foam inhibitors, especially silicone- and/or paraffin-containing foam inhibitors, are preferably bound to a granular, water-soluble or -dispersible carrier substance. Mixtures of paraffins and bistearylethylenediamide are particularly preferred.

Useful peroxygen compounds optionally present in the compositions, especially the compositions in solid form, are in particular organic peracids or peracidic salts of organic acids, such as phthalimidopercaproic acid, perbenzoic acid or salts of diperdodecanedioic acid, hydrogen peroxide and inorganic salts which release hydrogen peroxide under the washing conditions, such as perborate, percarbonate and/or persilicate. Hydrogen peroxide can in this case also be produced with the aid of an enzymatic system, i.e. an oxidase and its substrate. If solid peroxygen compounds are intended to be used, they can be used in the form of powders or granules, which can also be enveloped in a manner known in principle. Particular preference is given to using alkali metal percarbonate, alkali metal perborate monohydrate, alkali metal perborate tetrahydrate or, in particular in liquid compositions, hydrogen peroxide in the form of aqueous solutions comprising 3% by weight to 10% by weight hydrogen peroxide. Peroxygen compounds are preferably present in laundry detergent compositions in amounts of up to 50% by weight, especially of 5% by weight to 30% by weight.

It is additionally possible to use customary bleach activators which form peroxocarboxylic acids or peroxoimidic acids under perhydrolysis conditions and/or customary bleach-activating transition metal complexes. The bleach activator component which is optionally present, in particular in amounts of 0.5% by weight to 6% by weight, encompasses the typically used N- or O-acyl compounds, for example polyacylated alkylenediamines, especially tetraacetylethylenediamine, acetylated glycolurils, especially tetraacetylglycoluril, N-acylated hydantoins, hydrazides, triazoles, urazoles, diketopiperazines, sulfurylamides and cyanurates, and also carboxylic anhydrides, especially phthalic anhydride, carboxylic esters, especially sodium isononanoylphenolsulfonate, and acylated sugar derivatives, especially pentaacetylglucose, and also cationic nitrile derivatives such as trimethylammoniumacetonitrile salts. To avoid interaction with the peroxygen compounds on storage, the bleach activators may have been granulated or coated in a known manner with coating substances, with particular preference being given to tetraacetylethylenediamine granulated with the aid of carboxymethyl cellulose and having mean particle sizes of 0.01 mm to 0.8 mm, granulated 1,5-diacetyl-2,4-dioxohexahydro-1,3,5-triazine, and/or trialkylammoniumacetonitrile manufactured in particulate form. Such bleach activators are present in laundry detergent compositions preferably in amounts of up to 8% by weight, in particular from 2% by weight to 6% by weight, based in each case on the total composition.

The production of solid compositions presents no difficulties and can be done in a manner known in principle, for example by spray drying or granulation. For the production of compositions with an increased bulk density, in particular in the range from 650 g/l to 950 g/l, preference is given to a process including an extrusion step. Laundry detergent compositions in the form of aqueous solutions or solutions comprising other customary solvents are particularly advantageously produced by simply mixing the ingredients, which can be added in neat form or as a solution to an automatic mixer.

In a likewise preferred embodiment, the compositions are present, in particular in concentrated liquid form, as a portion in a wholly or partially water-soluble envelope. The portioning facilitates meterability for the consumer.

The compositions can for example be packaged in film pouches in this case. Pouch packagings made from water-soluble film remove the need for the consumer to tear open the packaging. In this way, convenient metering of an individual portion tailored to one wash cycle is possible by placing the pouch directly into the washing machine or by putting the pouch into a certain amount of water, for example in a bucket, a bowl or in a hand wash basin. The film pouch enclosing the wash portion dissolves without residue on reaching a certain temperature.

The prior art includes numerous processes for producing portions of water-soluble laundry detergent composition which are in principle also suitable for producing compositions usable within the context of the present invention. The best-known processes in this case are the tubular film processes with horizontal and vertical sealing seams. Also suitable for the production of film pouches or else dimensionally stable laundry detergent composition portions is the thermoforming process. The water-soluble envelopes do not however necessarily have to consist of a film material, and can also be dimensionally stable containers which can for example be obtained by means of an injection molding process.

Processes for producing water-soluble capsules composed of polyvinyl alcohol or gelatin are also known and offer the possibility in principle of providing capsules with a high degree of filling. The processes are based on the introduction of the water-soluble polymer into a shaping cavity. The filling and sealing of the capsules is effected either concurrently or in successive steps, with the capsules being filled through a small opening in the latter case. The capsules are filled here for example by a filling wedge arranged above two counter-rotating drums comprising hemispherical shells on their surface. The drums guide polymer belts which cover the hemispherical-shell cavities. Sealing takes place at the positions at which the polymer belt of one drum meets the polymer band of the opposite drum. At the same time, the material to be filled is injected into the capsule that is forming, the injection pressure of the filling liquid pressing the polymer belts into the hemispherical-shell cavities. One process for producing water-soluble capsules, in which first the filling is effected and then the sealing, is based on what is known as the Bottle-Pack process. It involves guiding a tubular preform into a two-part cavity. The cavity is closed, the lower tube section being sealed, and then the tube is inflated to form the capsule form in the cavity, filled and finally sealed.

The envelope material used for producing the water-soluble portion is preferably a water-soluble polymeric thermoplastic, particularly preferably selected from the group of (optionally partially acetalized) polyvinyl alcohol, polyvinyl alcohol copolymers, polyvinylpyrrolidone, polyethylene oxide, gelatin, cellulose and its derivatives, starch and its derivatives, blends and composites, inorganic salts and mixtures of the materials mentioned, preferably hydroxypropyl methyl cellulose and/or polyvinyl alcohol blends. Polyvinyl alcohols are commercially available, for example under the trade name Mowiol® (Clariant). Particularly suitable polyvinyl alcohols within the context of the present invention are for example Mowiol® 3-83, Mowiol® 4-88, Mowiol® 5-88, Mowiol® 8-88 and Clariant L648. The water-soluble thermoplastic used for producing the portion can additionally optionally comprise polymers selected from the group comprising acrylic acid-containing polymers, polyacrylamides, oxazoline polymers, polystyrene sulfonates, polyurethanes, polyesters, polyethers and/or mixtures of said polymers. It is preferred when the water-soluble thermoplastic used comprises a polyvinyl alcohol, the degree of hydrolysis of which amounts to 70 mol % to 100 mol %, preferably 80 mol % to 90 mol %, particularly preferably 81 mol % to 89 mol % and in particular 82 mol % to 88 mol %. It is further preferable for the water-soluble thermoplastic used to comprise a polyvinyl alcohol having a molecular weight in the range from 10 000 g/mol to 100 000 g/mol, preferably from 11 000 g/mol to 90 000 g/mol, particularly preferably from 12 000 g/mol to 80 000 g/mol and especially from 13 000 g/mol to 70 000 g/mol. It is further preferable for the thermoplastics to be present in amounts of at least 50% by weight, preferably of at least 70% by weight, particularly preferably of at least 80% by weight, and especially of at least 90% by weight, in each case based on the weight of the water-soluble polymeric thermoplastic.

EXAMPLES

Example 1: Preparation of Polymers

Unless Otherwise Stated, the Following Methods were Used for Characterization.

GPC (Gel Permeation Chromatography):

To ascertain the average molecular weight of the polymers obtained, gel permeation chromatography was performed in THF as solvent. The GPC system was calibrated with linear polystyrene standards in the molar mass range of 682-2 520 000 g/mol.

OH Number:

The hydroxyl number was determined titrimetrically in accordance with ASTM E 1899-97.

Amine Number:

The amine number was determined by titration with trifluoromethanesulfonic acid.

P1: 74.6 g (0.50 mol) of triethanolamine and 5.53 g of 50% (% by weight) KOH solution were mixed and then dewatered in an autoclave for two hours at 100° C. and <10 mbar. The autoclave was inertized by flushing three times with nitrogen and a supply pressure of 2 bar was set. The reactor was then heated to 120-130° C. and 1307 g (22.5 mol) of propylene oxide were added in order to produce three 15-PO/OH arms (a total of 45 PO/triethanolamine). After the end of the metering, the reaction was allowed to react until the pressure was constant. Volatile components were removed at 90° C. and 20 mbar over two hours. The product was characterized by 1H NMR, OH number, amine number and GPC.

P2: 99.68 g (0.60 mol) of triethanolamine and 6.00 g of 50% (% by weight) KOH solution were mixed and then dewatered in an autoclave for two hours at 100° C. and <10 mbar. The autoclave was inertized by flushing three times with nitrogen and a supply pressure of 2 bar was set. The reactor was then heated to 120-130° C. and 1261 g (21.7 mol) of propylene oxide were added in order to produce three 12-PO/OH arms (a total of 36 PO/triethanolamine). After the end of the metering, the reaction was allowed to react until the pressure was constant. Volatile components were removed at 90° C. and 20 mbar over two hours. The product was characterized by 1H NMR, OH number, amine number and GPC.

P3: 366 g (4.9 mol) of tert-butylamine and 18.3 g of water were. The autoclave was inertized by flushing three times with nitrogen and then a supply pressure of 2 bar was set. The reactor was then heated to 100° C. and 581 g (10.0 mol) of propylene oxide were added in order to produce tert-butylamine+2PO. After the end of the metering, the reaction was allowed to react until the pressure was constant. Volatile components were removed at 80° C. and 20 mbar over two hours. The intermediate was characterized by 1H NMR, OH number, amine number and GPC.

170 g (0.89 mol) of the intermediate and 5.30 g of 50% (% by weight) KOH solution were mixed and then dewatered in an autoclave for two hours at 130° C. and <10 mbar. The autoclave was inertized by flushing three times with nitrogen and then a supply pressure of 2 bar was set. The reactor was then heated to 120-130° C. and 1150 g (19.8 mol) of propylene oxide were added in order to produce two 12-PO/OH arms (a total of 24 PO/tert-butylamine). After the end of the metering, the reaction was allowed to react until the pressure was constant. Volatile components were removed at 80° C. and 20 mbar over two hours. The product was characterized by 1H NMR, OH number, amine number and GPC.

P4: 104 g (0.54 mol) of triisopropanolamine and 4.2 g of 50% (% by weight) KOH solution were mixed and then dewatered in an autoclave for two hours at 100° C. and <10 mbar. The autoclave was inertized by flushing three times with nitrogen and a supply pressure of 2 bar was set. The reactor was then heated to 120-130° C. and 1415 g (24.4 mol) of propylene oxide were added in order to produce three 15-PO/OH arms (a total of 45 PO/triisopropanolamine). After the end of the metering, the reaction was allowed to react until the pressure was constant. Volatile components were removed at 90° C. and 20 mbar over two hours. The product was characterized by 1H NMR, OH number, amine number and GPC.

Example 2: Wash Tests

Textile fabrics made from the materials specified in table 2 and which had been provided with the standardized soiling likewise specified in table 2 were washed at 30° C. with washing liquors each comprising 0.88 g/l of a laundry detergent composition V1, W1, W2 or W3 having the composition given in table 1 and then dried. The resulting brightness values (Y values) were determined. It can be seen that when a polymer essential to the invention was added the washing results were significantly better than in the absence of such addition.

TABLE 1

| Composition of laundry detergent (% by weight) | | | | | |
|---|---|---|---|---|---|
| Ingredient/composition | V1 | W1 | W2 | W3 | W4 |
| Linear $C_{10-13}$-alkylbenzenesulfonate | 22 | 22 | 22 | 22 | 22 |
| $C_{13/15}$-oxo alcohol having 8 EO | 24 | 24 | 24 | 24 | 24 |
| $C_{12-18}$ fatty acid | 7.5 | 7.5 | 7.5 | 7.5 | 7.5 |
| Polymer P1 | — | 5 | — | — | — |
| Polymer P2 | — | — | 5 | — | — |
| Polymer P3 | — | — | — | 5 | — |
| Polymer P4 | — | — | — | — | 5 |
| Propylene glycol | 8 | 8 | 8 | 8 | 8 |
| Glycerol | 10.5 | 10.5 | 10.5 | 10.5 | 10.5 |
| Optical brightener | 0.6 | 0.6 | 0.6 | 0.6 | 0.6 |
| Monoethanolamine | 6 | 6 | 6 | 6 | 6 |
| DTPMPA 7Na | 0.7 | 0.7 | 0.7 | 0.7 | 0.7 |
| Ethanol | 3 | 3 | 3 | 3 | 3 |
| Soil Release Polymer Texcare ® SRN 170 | 1.4 | 1.4 | 1.4 | 1.4 | 1.4 |
| Perfume | 1.7 | 1.7 | 1.7 | 1.7 | 1.7 |
| Water | | | ad 100 | | |

TABLE 2

| Brightness values (Y) | | | | | |
|---|---|---|---|---|---|
| Soiling; textile/ composition | V1 | W1 | W2 | W3 | W4 |
| Make-up 1; cotton | 33.5 | 34.7 | 36.8 | 36.0 | 35.1 |
| Make-up 2; cotton | 31.1 | 34.3 | 32.4 | 33.3 | 32.0 |
| Make-up 3; polyester | 45.5 | 50.3 | 44.9 | 47.6 | 47.8 |
| Make-up 4; polyester | 28.4 | 47.3 | 44.5 | 41.5 | 40.7 |
| Beef tallow; cotton | 65.0 | 69.5 | 75.4 | 68.4 | 67.7 |
| Lipstick 1; polyester | 35.7 | 36.6 | 39.0 | 35.8 | 35.8 |
| Lipstick 2; polyester | 50.4 | 56.5 | 60.0 | 55.4 | 56.2 |
| Grass; cotton | 68.9 | 69.8 | 68.7 | 71.8 | 69.7 |

The invention claimed is:

1. A method of using a polymer comprising monoamino-based alkoxylates having an average molecular weight $M_w$ of 600-10 000 g/mol, the method comprising adding the polymer to a composition which is free of the polymer or to a washing liquor which comprises a composition which is free of the polymer, wherein the method enhances the primary detergency of laundry detergent compositions when washing textiles in aqueous and surfactant-containing washing liquid with respect to soiling, wherein the polymer comprises three chains of alkylene oxide units per nitrogen atom, wherein the soiling is surfactant- or enzyme-sensitive soiling, wherein the polymer comprises more than 50 mol % propylene oxide units, based on the sum total of all alkylene oxide units, wherein the polymer comprises, per alkylene oxide chain, 10 to 60 alkylene oxide units, wherein the polymer is obtainable by reacting a starter with an alkylene oxide, wherein the polymer is based on a starter selected from the group consisting of triethanolamine and triisopropanolamine.

2. The method of use according to claim 1, wherein the amount of polymer added, based on the amount of composition which is free of the polymer, is in a range from 0.01% by weight to 20% by weight.

3. The method of use according to claim 1, wherein the amount of polymer added, based on the amount of composition which is free of the polymer, is in a range from 1% by weight to 15% by weight.

4. The method according to claim 1, wherein the polymer is according to the following formula:

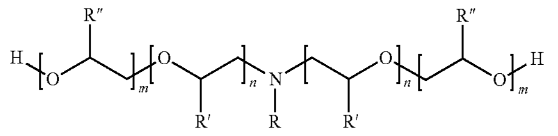

wherein:

R is $(CH_2—CHR'O)_n—(CH_2CHR''O)_m—H$;

R' is H, $CH_3$, or $CH_2CH_3$;

R'' is H, $CH_3$, or $CH_2CH_3$;

n is 0-18; and m is 0-18.

5. A method for removing surfactant- or enzyme-sensitive soiling from textiles, the method comprising bringing a polymer comprising monoamino-based alkoxylates, having an average molecular weight $M_w$ of 600-10 000 g/mol, into contact with soiled textiles, wherein the polymer is in an aqueous and surfactant-containing washing liquor, wherein the soiling is surfactant- or enzyme-sensitive soiling, wherein the polymer comprises more than 50 mol % propylene oxide units, based on the sum total of all alkylene oxide units, wherein the polymer comprises, per alkylene oxide chain, 10 to 60 alkylene oxide units, wherein the polymer comprises three chains of alkylene oxide units per nitrogen atom, and wherein the polymer is based on a starter selected from the group consisting of triethanolamine and triisopropanolamine.

6. The method according to claim 5 wherein the washing liquor is produced by adding from 10 ml to 100 ml of a liquid water-containing laundry detergent composition to 12 liters to 60 liters of water.

7. The method according to claim 6, wherein the composition has a surfactant concentration of at least 30% by weight.

8. The method according to claim 6, wherein the composition has a surfactant concentration in a range from 30% by weight to 65% by weight.

9. The method according to claim 5, wherein the polymer comprises more than 90 mol % propylene oxide units, based on the sum total of all alkylene oxide units.

10. The method according to claim 5, wherein the polymer comprises exclusively propylene oxide units, based on the sum total of all alkylene oxide units.

11. The method according to claim 5, wherein the polymer is based on triethanolamine.

12. The method according to claim 5, wherein the polymer is based on triisopropanolamine.

13. The method according to claim 5, wherein the polymer comprises, per alkylene oxide chain, 12 to 16 alkylene oxide units.

14. The method according to claim 5, wherein the polymer comprises 12 alkylene oxide units per alkylene oxide chain.

15. The method according to claim 5, wherein the polymer comprises 15 alkylene oxide units per alkylene oxide chain.

16. The method according to claim 5, wherein the average molecular weight of the polymer is in a range from 1300-6000 g/mol.

17. The method according to claim 5, wherein the polymer consists of monoamino-based propoxylates.

18. The method according to claim 5, wherein the washing liquor is produced by adding from 15 ml to 75 ml of a liquid water-containing laundry detergent composition to 15 liters to 20 liters of water.

* * * * *